United States Patent
Cagle

(10) Patent No.: US 11,938,070 B1
(45) Date of Patent: Mar. 26, 2024

(54) CABLE HOLDER FOR HOSPITAL BEDS

(71) Applicant: Christopher Adam Cagle, Hendersonville, TN (US)

(72) Inventor: Christopher Adam Cagle, Hendersonville, TN (US)

(*) Notice: Subject to any disclaimer, the term of this patent is extended or adjusted under 35 U.S.C. 154(b) by 0 days.

(21) Appl. No.: 17/850,064

(22) Filed: Jun. 27, 2022

(51) Int. Cl.
*A61G 7/05* (2006.01)
*F16L 3/223* (2006.01)
*H02G 3/04* (2006.01)

(52) U.S. Cl.
CPC ............. *A61G 7/05* (2013.01); *F16L 3/223* (2013.01); *H02G 3/0456* (2013.01)

(58) Field of Classification Search
CPC .......... A61G 7/05; F16L 3/223; H02G 3/0456
See application file for complete search history.

(56) References Cited

U.S. PATENT DOCUMENTS

| | | | |
|---|---|---|---|
| 2,893,677 A | | 7/1959 | Dannenburg |
| 4,312,352 A | | 1/1982 | Meisch |
| 4,702,443 A | * | 10/1987 | Callaway ............... F16L 3/00 24/456 |
| 5,334,186 A | | 8/1994 | Alexander |
| D629,671 S | * | 12/2010 | Ohori ........................ D8/356 |
| D684,845 S | | 6/2013 | Wood |
| 8,464,984 B2 | * | 6/2013 | Laursen ................. H02G 3/30 248/68.1 |
| 8,523,098 B2 | * | 9/2013 | Detweiler ............ H04R 1/1033 242/405.1 |
| 10,259,396 B2 | * | 4/2019 | Dyle ...................... B60R 11/00 |
| 10,433,926 B2 | | 10/2019 | Recanati |
| 10,966,891 B2 | | 4/2021 | Kitt |
| 11,439,804 B1 | * | 9/2022 | Dill ........................ A61M 39/08 |
| 2005/0006534 A1 | * | 1/2005 | Shillings ................ F16L 3/223 248/68.1 |
| 2006/0031988 A1 | * | 2/2006 | Morse .................. A61G 7/0503 280/304 |
| 2008/0116157 A1 | * | 5/2008 | Fulbrook ............ A61M 5/1415 248/176.1 |
| 2013/0092781 A1 | * | 4/2013 | Gregory ............... B65H 75/446 242/404 |
| 2017/0258984 A1 | * | 9/2017 | Meyer ................... F16L 3/222 |
| 2020/0300385 A1 | * | 9/2020 | Hall .................... F16G 11/101 |
| 2020/0306117 A1 | * | 10/2020 | Moudy .................. A61G 13/10 |
| 2020/0315887 A1 | * | 10/2020 | Bradford ................. A61G 7/015 |

OTHER PUBLICATIONS

Kyqee kitchen appliance cord winder sold on amazon discloses a cord winder with hooks or wings. dated Apr. 26, 2022 (Year: 2022).*
Pzoz cord organizer for appliances sold on amazon.com dated Mar. 16, 2022 (Year: 2022).*
Beata Clasp sold on beataclasp.com (Year: 2018).*
Online article by Richard Rands titled "Reducing infection in healthcare with cable management" dated Aug. 5, 2020, www.fastfixtechnology.com (Year: 2020).*
Tripp-Lite mounting clamp # PSCLAMP2 owner's manual dated 2018 (Year: 2018).*
Tripp-Lite mounting clamp # PSCLAMP2 product literature sheet dated 2021 (Year: 2021).*

* cited by examiner

*Primary Examiner* — Terrell L McKinnon
*Assistant Examiner* — Ding Y Tan
(74) *Attorney, Agent, or Firm* — Shane Cortesi

(57) ABSTRACT

The present disclosure provides a cable holder for hospital beds. The cable holder may include one or more hooks that attach to the headboard of a hospital bed and one or more protrusions, such as wings, for holding the cable.

22 Claims, 8 Drawing Sheets

CABLE HOLDER FOR HOSPITAL BEDS

BACKGROUND

Technical Field

The present invention relates to cable holders/organizers for hospital beds.

Background of the Invention

Hospital beds typically are associated with a number of cables, including electrical cables such as a power cord. Unfortunately, such cable present difficulties when moving hospital beds.

Thus, there is a need for cable organizers that make it easier and safer to transport hospital beds.

SUMMARY OF THE INVENTION

The present disclosure provides a cable holder as described herein.

DETAILED DESCRIPTION

Figure 1:
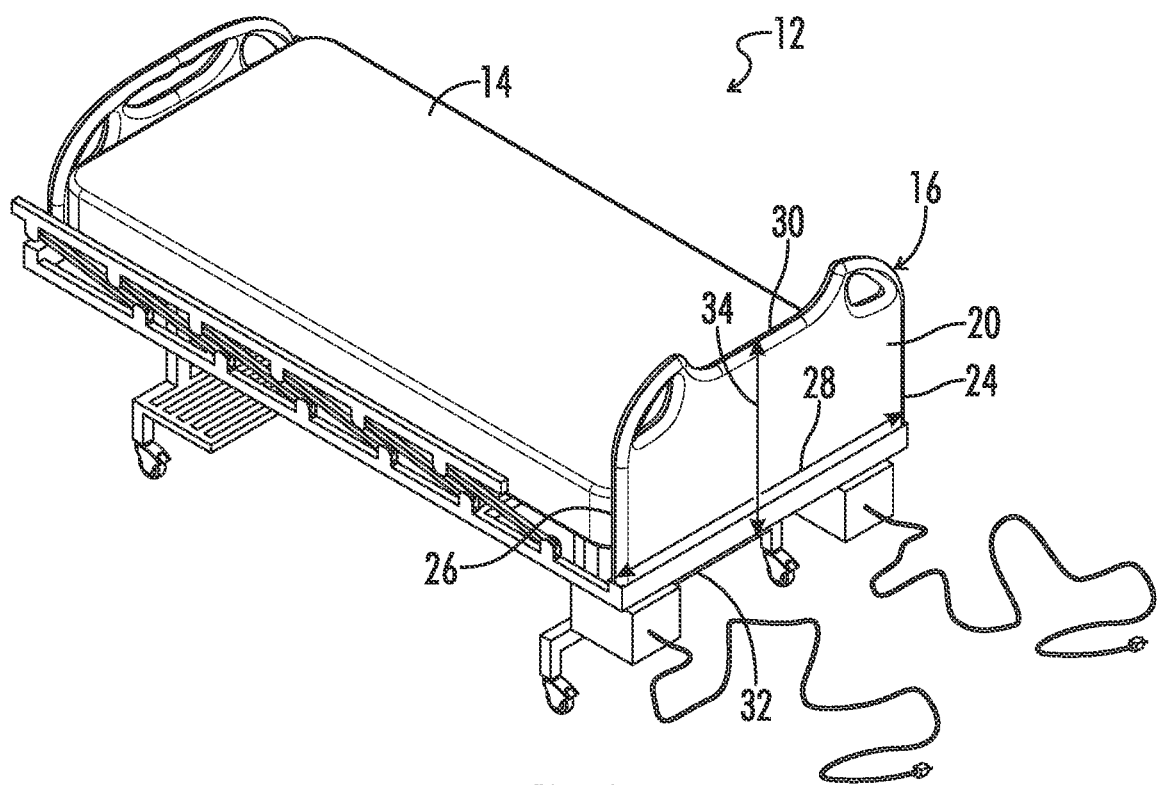
FIG. 1 illustrates a front perspective view of a hospital bed for use with the cable holder of the present invention.
Figure 2:
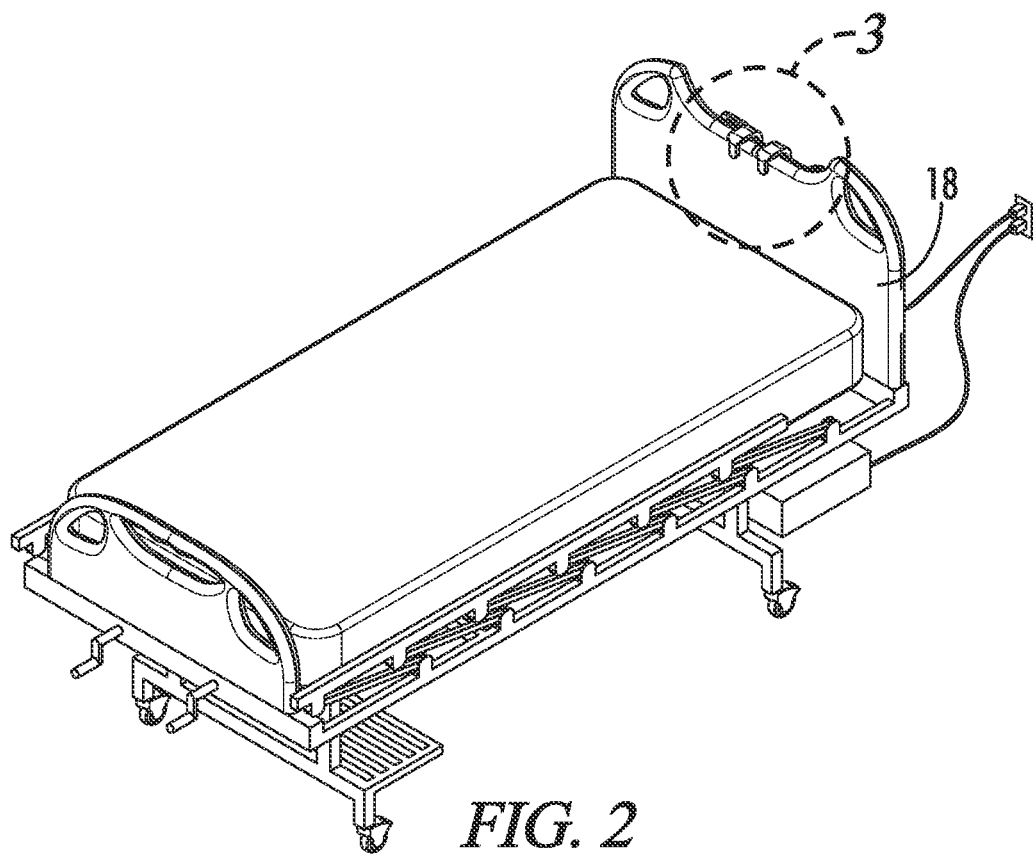
FIG. 2 illustrates a rear perspective view of a cable holder of one embodiment of the present invention attached to the headboard of the hospital bed of FIG. 1.
Figure 3:
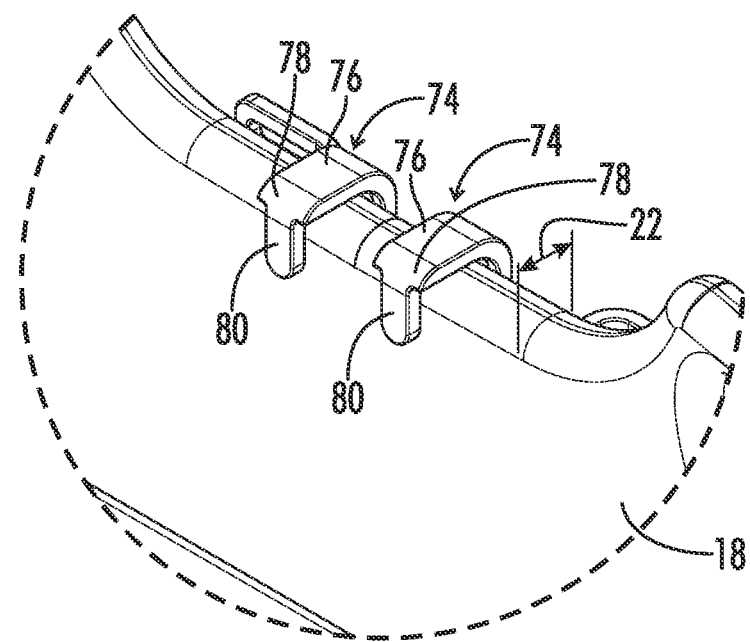
FIG. 3 is a closeup view of the circled area labelled 3 in FIG. 2.
Figure 4:
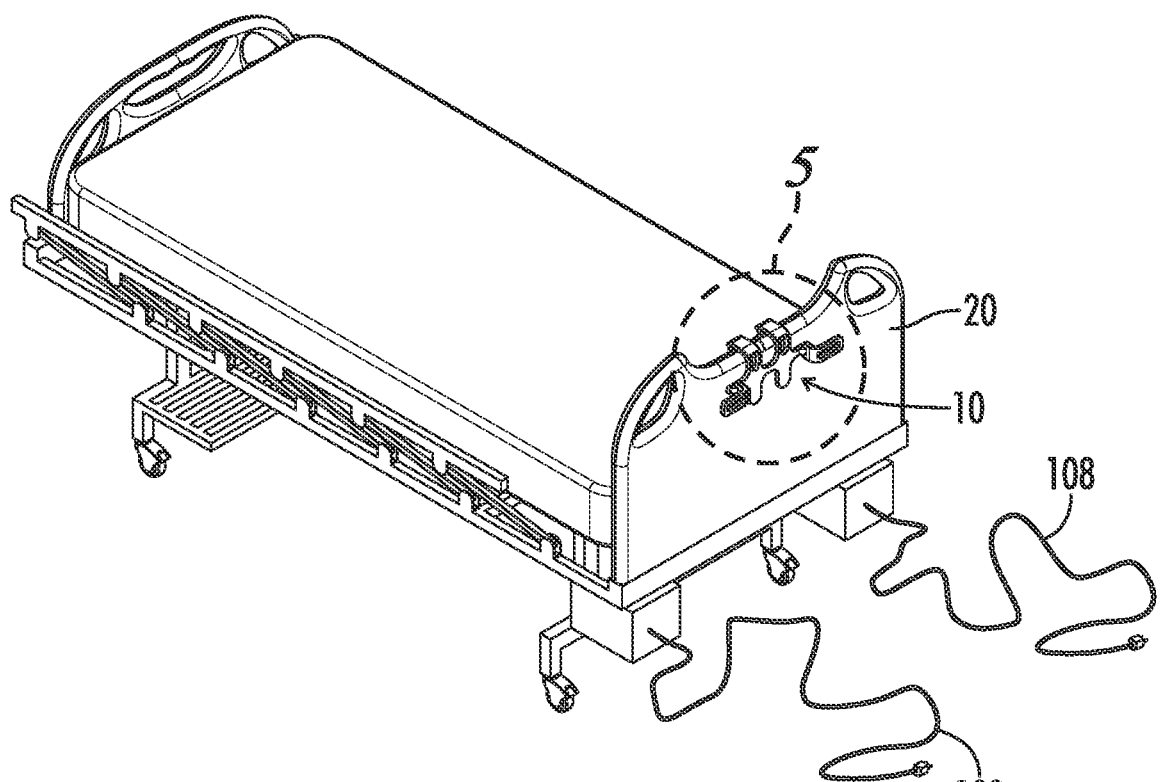
FIG. 4 illustrates a front perspective view of the cable holder of and hospital bed of FIG. 2.
Figure 5:
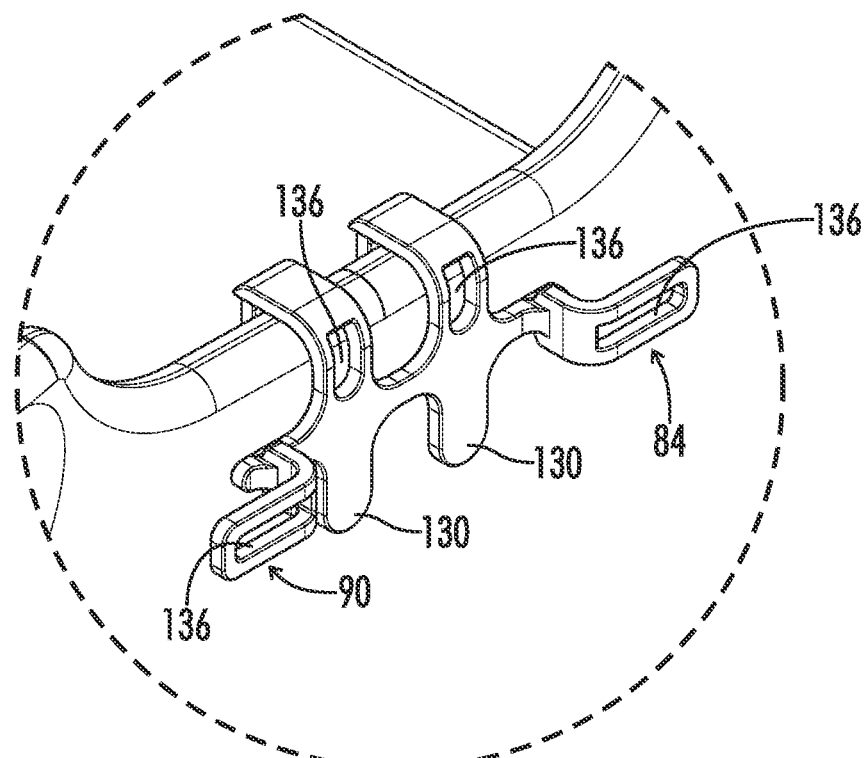
FIG. 5 is a closeup view of the circled area labelled 5 in FIG. 4.
Figure 6:
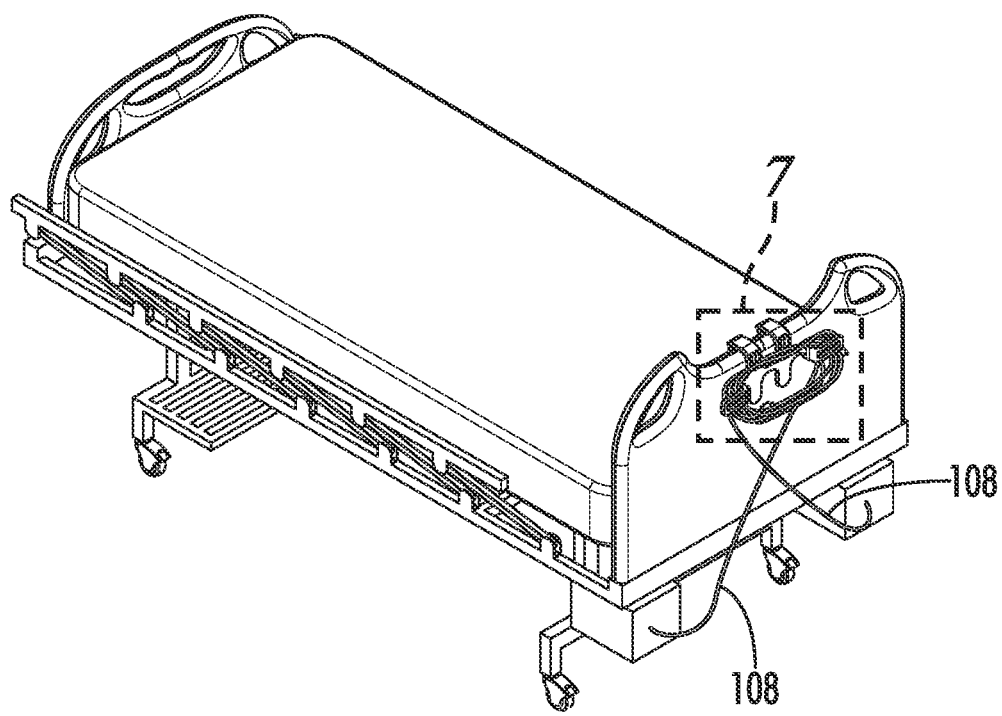
FIG. 6 illustrates a front perspective view of the cable holder of and hospital bed of FIG. 2 with the cables wrapped around the wings of the cable holder.

With reference to FIGS. 1-16 the present disclosure provides a cable holder designated by the numeral 10. In the drawings, not all reference numbers are included in each of the drawings for the sake of clarity. FIGS. 1-16 are generally drawn to scale, however, it will be appreciated that other dimensions are possible.

Referring further to FIGS. 1-16, in certain embodiments, in some embodiments, the present disclosure is directed to a method of attaching a cable holder 10 to a hospital bed 12. The method may include providing a hospital bed 12 that may include a mattress 14 and a headboard 16. The hospital bed 12 may include a headboard 16 having a headboard rear surface 18 facing the mattress 14, a headboard front surface 20, a headboard thickness 22 extending from the headboard front surface 20 to the headboard rear surface 18, a headboard left end 24, a headboard right end 26, a headboard width 28 extending from the headboard left end 24 to the headboard right end 26 and perpendicular to the headboard thickness 22, a headboard top 30, a headboard bottom 32, and a headboard height 34 extending from the headboard top 30 to the headboard bottom 32 and perpendicular to the headboard thickness 22 and headboard width 28.

It will be understood that the features of the hospital bed 12 are not critical, and the hospital bed 12 itself is not the present invention. Rather, the cable holder 10 (described below) and the method of attachment (preferably removable attachment) of the cable holder 10 to any suitable hospital bed 12 form the basis for the present invention. Thus, the hospital bed 12 is described primarily for the purpose of describing the attachment point for the cable holder 10.

The method may further include providing a cable holder 10. The cable holder 10 may include a holder front 36, a holder rear 38, a holder thickness 40 extending from the holder front 36 to the holder rear 38, a holder left side 42, a holder right side 44, a holder width 46 extending from the holder left side 42 to the holder right side 44 and perpendicular to the holder thickness 40, a holder top 48, a holder bottom 50, a holder height 52 extending from the holder top 48 to the holder bottom 50 and perpendicular to the holder thickness 40 and holder width 46. The holder 10 may further include a holder body 54 that may include a body front 56, a body rear 58, a body thickness 60 extending from the body front 56 to the body rear 58 and parallel to the holder thickness 40, a body left side 62, a body right side 64, a body width 66 extending from the body left side 62 to the body right side 64 and perpendicular to the body thickness 60 and parallel to the holder width 46, a body top 68, a body bottom 70, a body height 72 extending from the body top 68 to the body bottom 70 and perpendicular to the body thickness 60 and body width 66 and parallel to the holder height 52. The holder 10 may further include at least one hook 74, which may include a hook top 76 extending from the body top 68 rearwardly toward the holder rear 38. The hook top 76 may include a hook top rear 78 located at the holder rear 38. The hook 74 may further include a hook leg 80 extending downwardly from the hook top 76, and a hook cavity 82 defined by the hook leg 80, hook top 76 and body rear 58. Preferably, the cable holder 10 includes two hooks 74 as shown in the illustrations.

Optionally, the holder thickness 40 is between about 3 inches and about 8 inches, the holder width 46 is between about 10 inches and about 25 inches and the holder height 52 is between about 5 inches and about 15 inches though it will be understood that all dimensions provided herein are exemplary.

The holder 10 may include one or more protrusions to hold the cable(s) associated with the hospital bed 12. Optionally, the protrusion are two wings 84 and 90 at opposite sides of the holder 10. More specifically, the protrusion may include a left wing 84 that include a left wing proximal section 86 extending from the body left side 62 forwardly towards the holder front 56. The left wing 82 may also include a left wing distal section 88 extending laterally from the left wing proximal section 86 towards the holder left side 42. The protrusion may also include a right wing 90 that may include a right wing proximal section 92 extending from the body right side 64 forwardly towards the holder front 36. The right wing 90 may also include a right wing distal section 94 extending laterally from the right wing proximal section 92 towards the holder right side 44.

The method may also include attaching the holder 10 to the headboard 16 by, for example, placing the hook top 76 on top of the headboard top 30, the hook leg 80 to the rear of the headboard rear 18 and the body rear 58 in front of the headboard front 20 so that the headboard 16 is captured in the hook cavity 82. Optionally, the attachment is not permanent and the holder 10 may be removed from the headboard 16. Alternatively, the holder 10 may be attached to another region of the hospital bed 12 such as the footboard or a rail.

The method may also include securing a cable 108 to the holder 10. The cable 108 may be any cable associated with the hospital bed 12 or patient, including but not limited to a power cable for the hospital bed 12.

Figure 7:
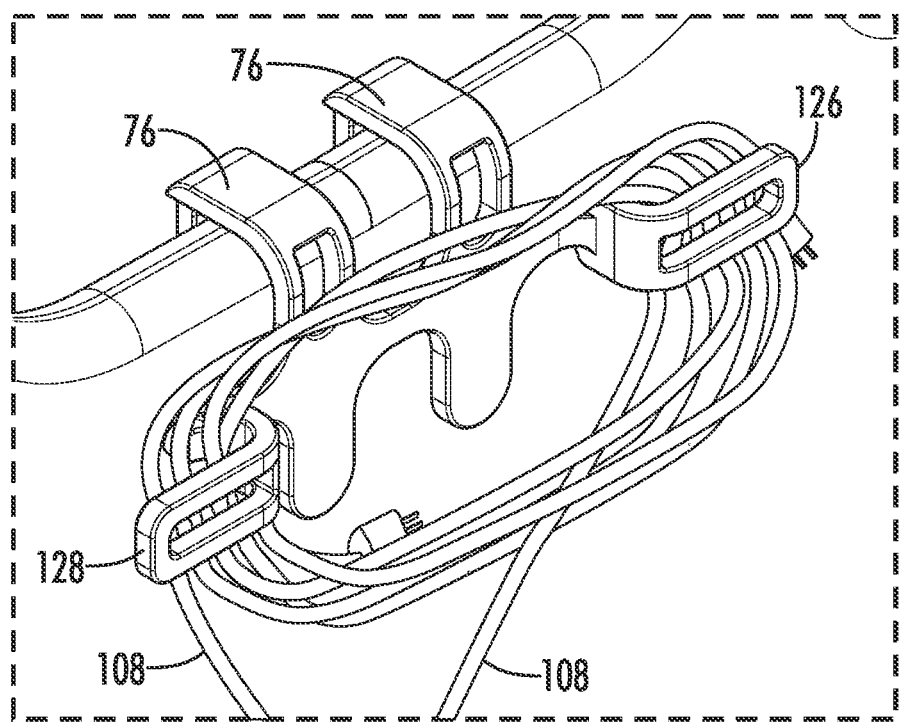
FIG. 7 illustrates a closeup view of the circled area labelled 7 in FIG. 6.
Figure 8:
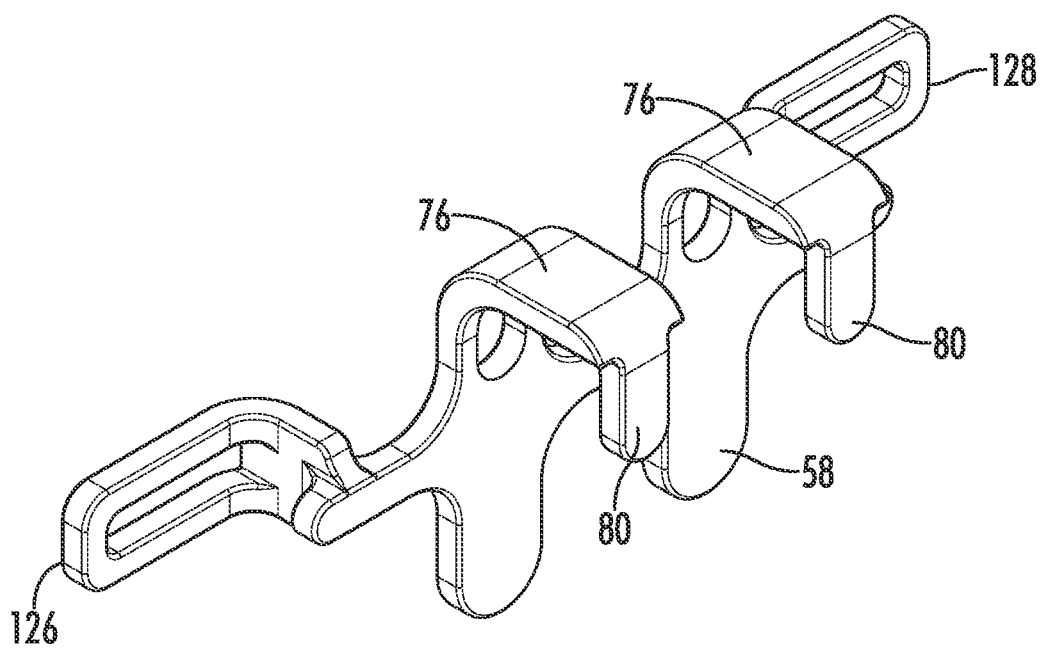
FIG. 8 illustrates a rear perspective view of the cable holder of FIG. 2.
Figure 9:
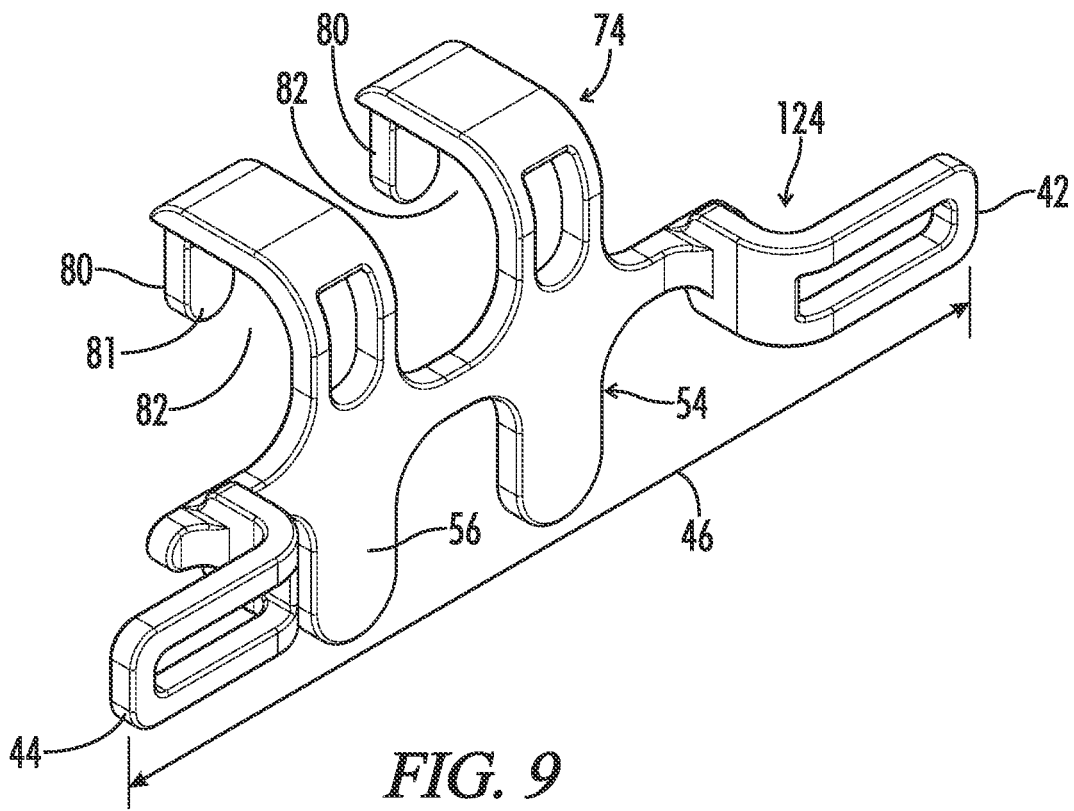
FIG. 9 illustrates a front perspective view of the cable holder of FIG. 2.

Optionally, the right wing proximal section 92 comprises a right wing proximal section right side 96, a right wing proximal section left side 98, and a right wing proximal section width 100 extending from the right wing proximal section right side 96 to the right wing proximal section left side 98 and parallel to the body width 66, and optionally, the left wing proximal section 86 comprises a left wing proximal section right side 102, a left wing proximal section left side 104, and a left wing proximal section width 106 extending from the left wing proximal section right side 102 to the left wing proximal section left side 104 and parallel to the body width 66. Optionally, as best seen in FIG. 7, the step of securing a cable 108 to the holder 10 comprises wrapping the cable 108 around the left wing proximal section left side 104 and the right wing proximal section right side 96.

Optionally, the right wing distal section 94 includes a right wing distal section front 110, a right wing distal section rear 112, a right wing distal section thickness 114 extending from the right wing distal section front 110 to the right wing distal section rear 112 and parallel to the body thickness 60. Optionally, the left wing distal section 88 includes a left wing distal section front 116, a left wing distal section rear 118, a left wing distal section thickness 120 extending from the left wing distal section front 116 to the left wing distal section rear 118 and parallel to the body thickness 60.

Optionally, the left wing distal section rear 118, the left wing proximal section left side 104 and the headboard front 20 create a left cavity 122 having an open left side and the right wing distal section rear 112, the right wing proximal section right side 96 and the headboard front 20 create a right cavity 124 having an open right side.

Optionally, the left wing distal section 88 comprises a left wing distal section left side 126 located at the holder left side 42 and optionally the right wing distal section 94 comprises a right wing distal section right side 128 located at the holder right side 44.

Optionally, after the holder 10 is secured to the headboard 16, the body rear 58 confronts the headboard front 20.

Optionally, to provide enough space for the cable(s) 108, the left wing distal section rear 112 and right wing distal section rear 112 are between about 1 and about 3 inches in front of the body rear 58, more preferably at least about 2 inches in front of the body rear 58. Optionally, the left wing distal section 88 and right wing distal section 94 are at the holder front 36. Optionally, left wing distal section 88 extends laterally from the left wing proximal section 86 toward the holder left side 42 for a distance of between about 2 inches and about 6 inches and the right wing distal section 94 extends laterally from the right wing proximal section 92 toward the holder right side 44 for a distance of between about 2 inches and about 6 inches. In other words, optionally, the wings 84, 90 have a width 144 of between about 2 inches and about 6 inches. Optionally, the wings 84,90 have a height 142 of between about 1 inch and about 4 inches.

Optionally, the hook cavity 82 comprises a thickness 140, as measured from the front of the hook leg 81 to the holder body rear 58, of between about 1 and about 3 inches, preferably at least about 2 inches.

Figure 10:
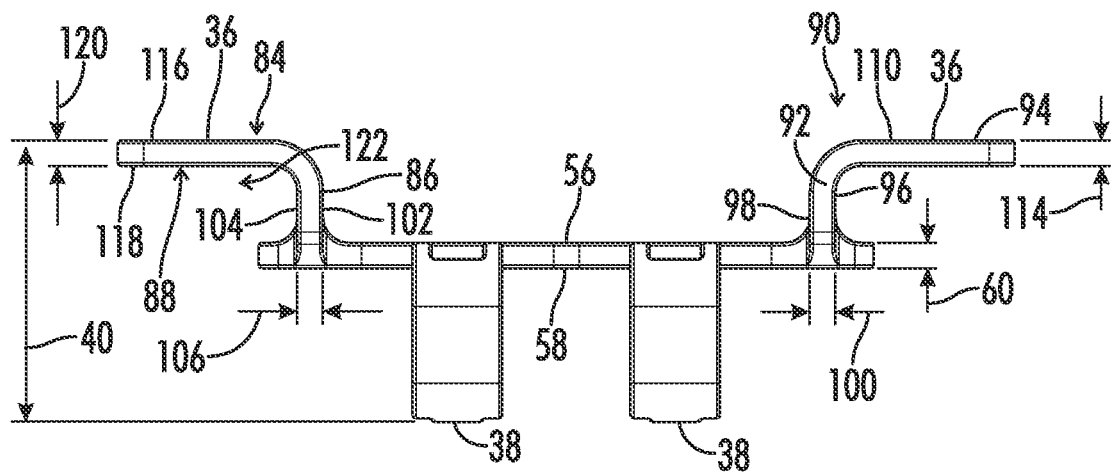
FIG. 10 illustrates a top plan view of the cable holder of FIG. 2.
Figure 11:
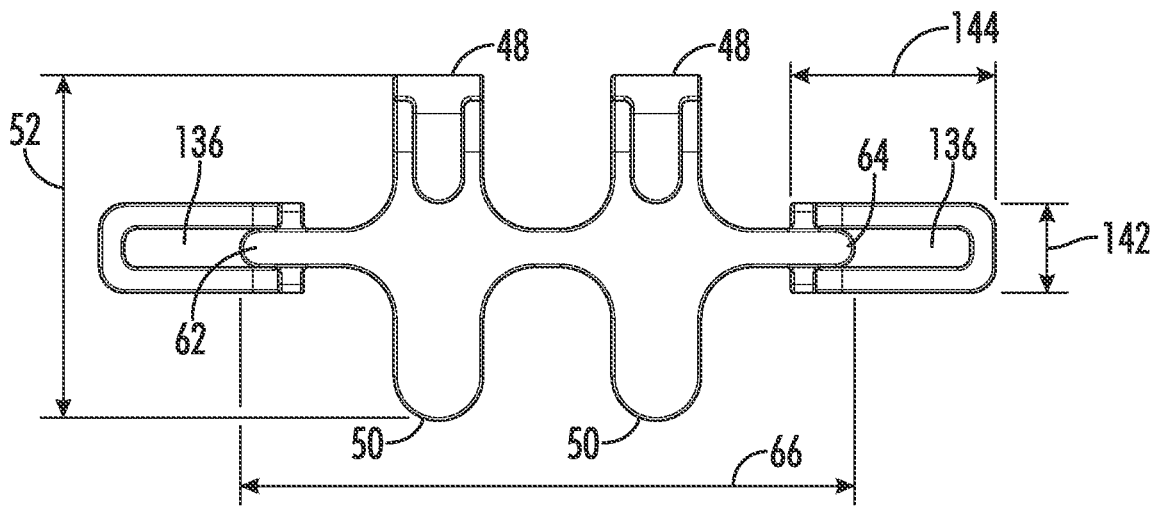
FIG. 11 illustrates a rear elevation view of the cable holder of FIG. 2.
Figure 12:
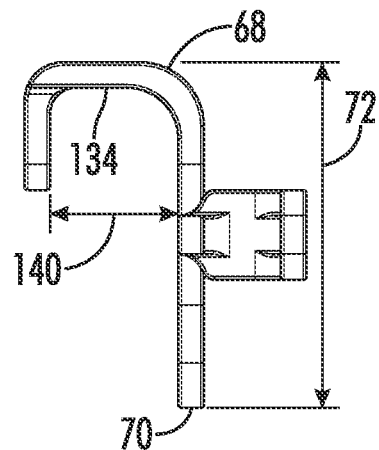
FIG. 12 illustrates a side elevation view of the cable holder of FIG. 2.
Figure 13:
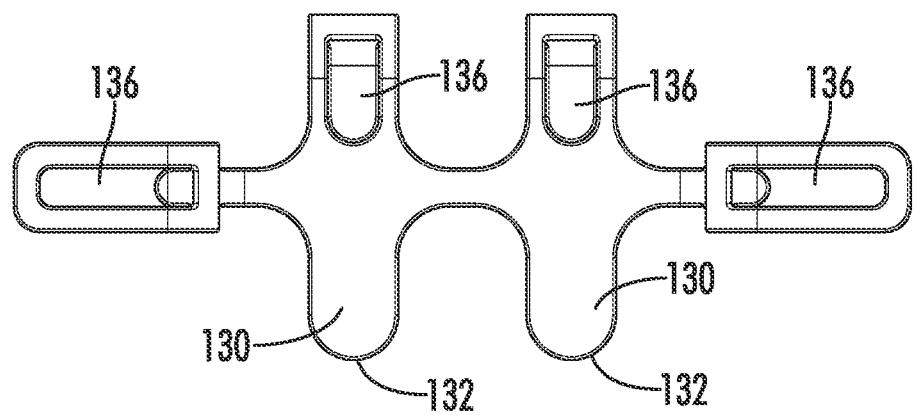
FIG. 13 illustrates a front elevation view of the cable holder of FIG. 2.
Figure 14:
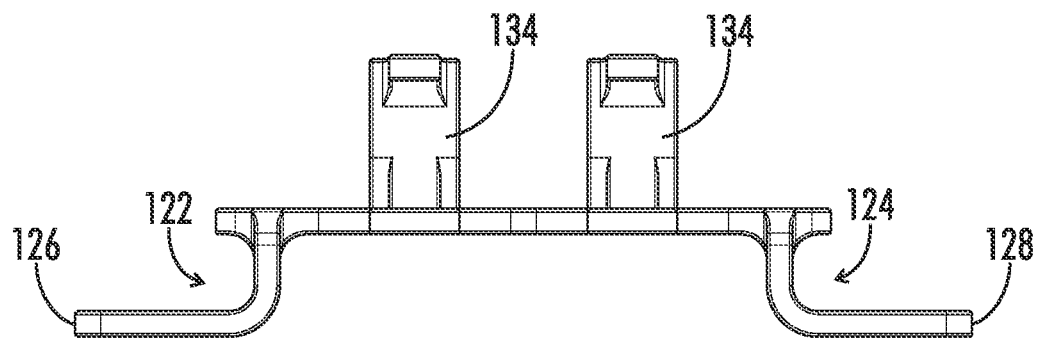
FIG. 14 illustrates a bottom plan view of the cable holder of FIG. 2.

Optionally, as shown in FIGS. 10 and 14 for example, the left wing 84 and the right wing 90 are L-shaped. Optionally, the body 54 further comprises at least one bottom leg 130 comprising a bottom leg bottom 132 located at the holder bottom 50. Optionally, as shown in FIG. 11 for example, the bottom leg 130 is aligned along the holder width 46 with the at least one hook 74. Optionally, as shown in FIG. 11 for example, the cable holder 10 comprises two hooks 74 and two bottom legs 130 and further wherein each bottom leg 130 is aligned along the holder width 46 with a hook 74. Optionally, as shown in FIG. 11 for example, the cable holder 10 is symmetrical about the center of the holder width 46. Optionally, as shown in FIG. 11 for example, the body 54 is H-shaped. Optionally, as shown in FIG. 11 for example, the bottom leg bottom 132 is located below (not directly below) the left and right wings 84,90. Optionally, as shown in FIG. 11, the body rear 58 is flat to aid in resting against the headboard front surface 20. Optionally, as shown in FIG. 12 for example, the hook top 76 comprises a flat bottom surface 134 confronting the headboard top 30. Without being bound by any particular theory, the legs 130 may provide stability.

Figure 15:
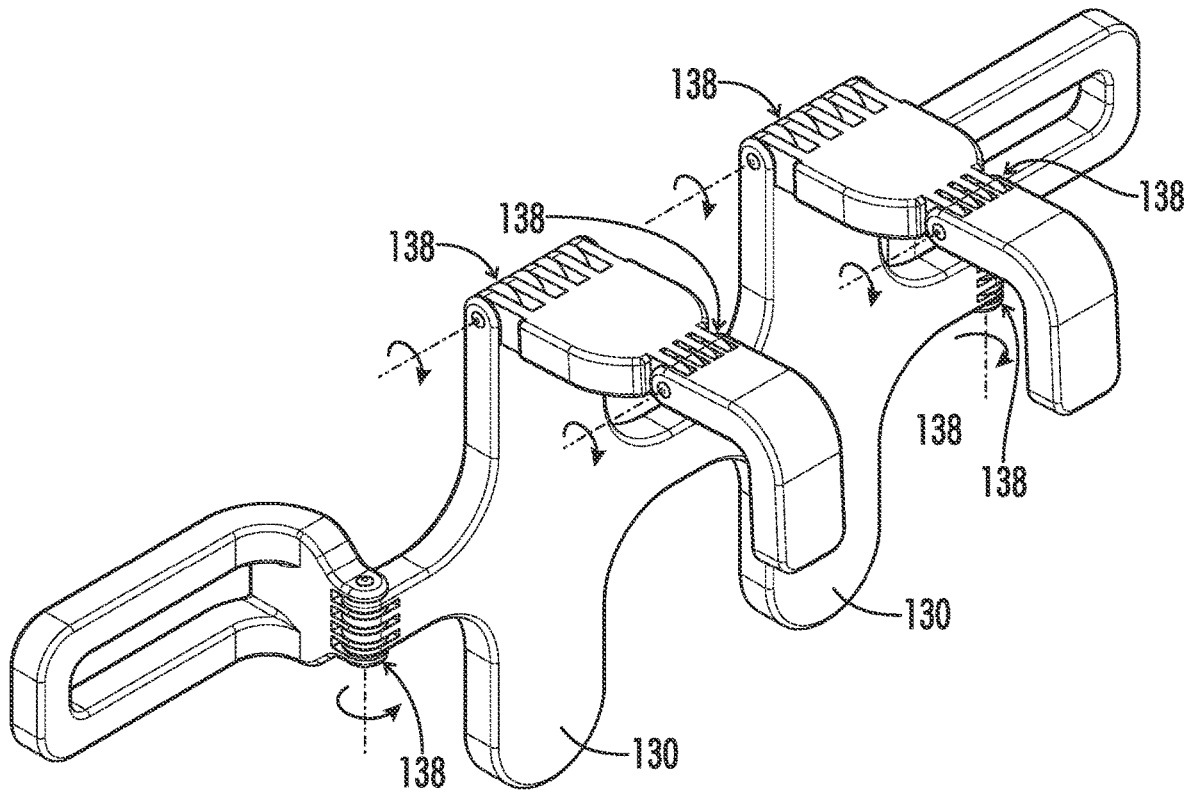
FIG. 15 illustrates a rear perspective view of a cable holder of another embodiment of the present invention in extended configuration; with the arrows showing how the wings and hooks are foldable along hinges.
Figure 16:
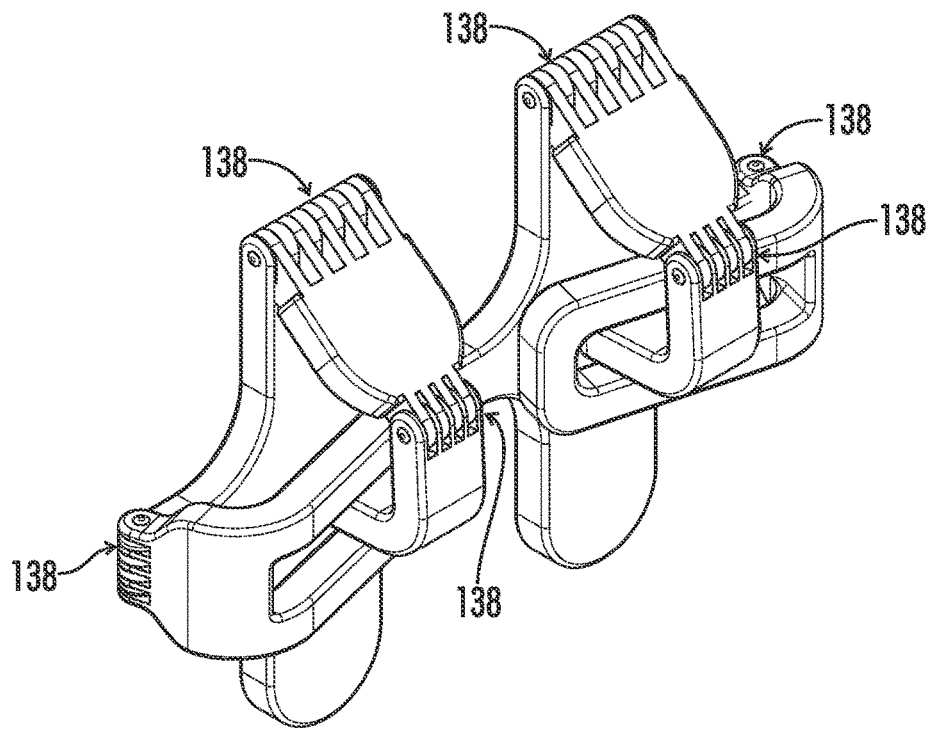
FIG. 16 illustrates a rear perspective view of the cable holder of FIG. 15 in the collapsed configuration.

Optionally, the wings 84,90 and/or hooks 74 are collapsible, as shown in FIGS. 15 and 16 where the wings 84,90 and hooks 74 pivot along hinges 138 to move between an extended configuration and a collapsed configuration.

The holder 10 may be made of any suitable material including plastic or metal for example. For example, optionally, the holder body 54 and hook(s) 74 are plastic but the hook front 81 and/or the hook top flat bottom surface 134 are lined with foam or another material such as rubber to provide a better grip.

Optionally, as shown in the illustrations the holder body 54 comprises one or more holes 136 extending through the body thickness 60 (e.g. from the body front 56 to the body rear 58) to reduce weight. Similarly, the wings 84,90 may include one or more holes 136. Preferably, however, the holder body 54 does not include holes 136 to prevent debris from being captured by the holder body 54.

PARTS LIST

Cable holder 10
Hospital bed 12
Mattress 14
Headboard 16
Headboard rear surface 18
Headboard front surface 20
Headboard thickness 22
Headboard left end 24
Headboard right end 26

Headboard width 28
Headboard top 30
Headboard bottom 32
Headboard height 34
Holder front 36
Holder rear 38
Holder thickness 40
Holder left side 42
Holder right side 44
Holder width 46
Holder top 48
Holder bottom 50
Holder height 52
Holder body 54
Holder body front 56
Holder body rear 58
Holder body thickness 60
Holder body left side 62
Holder body right side 64
Holder body width 66
Holder body top 68
Holder body bottom 70
Holder body height 72
Hook 74
Hook top 76
Hook top rear 78
Hook leg 80
Hook leg front 81
Hook cavity 82
Left wing 84
Left wing proximal section 86
Left wing distal section 88
Right wing 90
Right wing proximal section 92
Right wing distal section 94
Right wing proximal section right side 96
Right wing proximal section left side 98
Right wing proximal section width 100
Left wing proximal section right side 102
Left wing proximal section left side 104
Left wing proximal section width 106
Cable 108
Right wing distal section front 110
Right wing distal section rear 112
Right wing distal section thickness 114
Left wing distal section front 116
Left wing distal section rear 118
Left wing distal section thickness 120
Left cavity 122
Right cavity 124
Left wing distal section left side 126
Right wing distal section right side 128
Bottom leg 130
Bottom leg bottom 132
Hook top flat bottom surface 134
Holes 136
Hinge 138
Cavity Thickness 140
Wing Height 142
Wing Width 144

Having now described the invention in accordance with the requirements of the patent statutes, those skilled in the art will understand how to make changes and modifications to the disclosed embodiments to meet their specific requirements or conditions. Changes and modifications may be made without departing from the scope and spirit of the invention. In addition, the steps of any method described herein may be performed in any suitable order and steps may be performed simultaneously if needed. Use of the singular embraces the plural.

Terms of degree such as "generally", "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

What is claimed is:

1. A method of attaching a cable holder to a hospital bed comprising the steps of:
   a) providing a hospital bed comprising a mattress and a headboard, the headboard having a headboard rear surface facing the mattress, a headboard front surface, a headboard thickness extending from the headboard front surface to the headboard rear surface, a headboard left end, a headboard right end, a headboard width extending from the headboard left end to the headboard right end and perpendicular to the headboard thickness, a headboard top, a headboard bottom located below the headboard top, and a headboard height extending from the headboard top to the headboard bottom and perpendicular to the headboard thickness and headboard width;
   b) providing a cable holder comprising a holder front, a holder rear, a holder thickness extending from the holder front to the holder rear, a holder left side, a holder right side, a holder width extending from the holder left side to the holder right side and perpendicular to the holder thickness, a holder top, a holder bottom located below the holder top, a holder height extending from the holder top to the holder bottom and perpendicular to the holder thickness and holder width, the holder further comprising:
      i) a holder body comprising a body front, a body rear, a body thickness extending from the body front to the body rear and parallel to the holder thickness, a body left side, a body right side, a body width extending from the body left side to the body right side and perpendicular to the body thickness and parallel to the holder width, a body top, a body bottom located below the body top, a body height extending from the body top to the body bottom and perpendicular to the body thickness and body width and parallel to the holder height;
      ii) at least one hook extending from the body top rearwardly toward the holder rear, the least one hook comprising a hook top comprising a hook top top surface, a hook top bottom surface located below the hook top top surface, a hook top rear located at the holder rear, the at least one hook further comprising a hook leg extending downwardly from the hook top, the at least one hook further comprising a hook cavity defined by the hook leg, hook top and body rear; and
      iii) a left wing, the left wing comprising a left wing proximal section extending from the body left side forwardly towards the holder front, the left wing further comprising a left wing distal section extending laterally from the left wing proximal section towards the holder left side; and
      iv) a right wing, the right wing comprising a right wing proximal section extending from the body right side forwardly towards the holder front, the right wing further comprising a right wing distal section extending laterally from the right wing proximal section towards the holder right side;

c) attaching the holder to the headboard by placing the hook top bottom surface on top of the headboard top, the hook leg to the rear of the headboard rear surface and the body rear in front of the headboard front surface so that the hook top bottom surface extends continuously around and rests on the headboard top, the left wing is located in front of the headboard front surface, the right wing is located in front of the headboard front surface and the headboard top is captured in the hook cavity; and d) securing a cable to the holder by wrapping the cable around the left wing and the right wing.

2. The method of claim 1 wherein the right wing proximal section comprises a right wing proximal section right side, a right wing proximal section left side, and a right wing proximal section width extending from the right wing proximal section right side to the right wing proximal section left side and parallel to the body width, wherein the left wing proximal section comprises a left wing proximal section right side, a left wing proximal section left side, and a left wing proximal section width extending from the left wing proximal section right side to the left wing proximal section left side and parallel to the body width, and further wherein step d) comprises wrapping the cable around the left wing proximal section left side and the right wing proximal section right side.

3. The method of claim 2 wherein the right wing distal section comprises a right wing distal section front, a right wing distal section rear, a right wing distal section thickness extending from the right wing distal section front to the right wing distal section rear and parallel to the body thickness, wherein the left wing distal section comprises a left wing distal section front, a left wing distal section rear, a left wing distal section thickness extending from the left wing distal section front to the left wing distal section rear and parallel to the body thickness, and further wherein, the left wing distal section rear and right wing distal section rear are located at least two inches forwardly relative to the body rear.

4. The method of claim 3 wherein the left wing distal section rear, the left wing proximal section left side and the headboard front create a left cavity having an open left side and the right wing distal section rear, the right wing proximal section right side and the headboard front create a right cavity having an open right side.

5. The method of claim 3 wherein the left wing distal section comprises a left wing distal section left side located at the holder left side and further wherein the right wing distal section comprises a right wing distal section right side located at the holder right side.

6. The method of claim 3 wherein the left wing distal section rear and the right wing distal section rear are between about 1 inch and about 3 inches in front of the body rear.

7. The method of claim 6 wherein the left wing distal section front and right wing distal section front are at the holder front.

8. The method of claim 1 wherein the left wing distal section extends laterally from the left wing proximal section toward the holder left side for a distance of between about 2 inches and about 6 inches and the right wing distal section extends laterally from the right wing proximal section toward the holder right side for a distance of between about 2 inches and about 6 inches.

9. The method of claim 1 wherein the left wing and the right wing are L-shaped.

10. The method of claim 1 wherein the body further comprises at least one bottom leg comprising a bottom leg bottom located at the holder bottom.

11. The method of claim 10 wherein the bottom leg is aligned along the holder width with the at least one hook.

12. The method of claim 11 wherein the cable holder comprises two hooks and two bottom legs and further wherein each bottom leg is aligned along the holder width with a hook.

13. The method of claim 12 wherein the body is H-shaped.

14. The method of claim 12 wherein the bottom leg bottom is located below the left and right wings.

15. The method of claim 1 wherein the body rear is flat.

16. The method of claim 1 wherein the hook top bottom surface is flat.

17. The method of claim 1 wherein the holder body comprises one or more holes extending through the body thickness.

18. The method of claim 1 wherein the hook top is substantially straight.

19. The method of claim 1 wherein the hook leg comprises a hook leg front, the hook leg front oriented parallel to the body rear.

20. The method of claim 19 wherein the hook leg front and the body rear are oriented perpendicular to the hook top bottom surface.

21. The method of claim 1 wherein the hook cavity is substantially rectangular.

22. The method of claim 1 wherein the hook leg comprises a leg bottom below the leg top and further wherein the body bottom is below the leg bottom.

* * * * *